US008494924B2

(12) United States Patent
Beal et al.

(10) Patent No.: US 8,494,924 B2
(45) Date of Patent: Jul. 23, 2013

(54) METHOD, SYSTEM AND PROGRAM PRODUCT FOR PROCESSING TRANSACTION DATA

(75) Inventors: Alan Beal, Lewis Center, OH (US); Mark A. Flewellen, Powell, OH (US); Stewart H. Friedley, Louisville, KY (US); Terence H. Morris, Louisville, KY (US); Kenneth W. Slucher, Jr., Shelbyville, KY (US); Ramkumar Thilakaramanujam, Louisville, KY (US)

(73) Assignees: International Business Machines Corporation, Armonk, NY (US); Kentucky Lottery Corporation, Louisville, KY (US)

( * ) Notice: Subject to any disclaimer, the term of this patent is extended or adjusted under 35 U.S.C. 154(b) by 1734 days.

(21) Appl. No.: 11/371,842

(22) Filed: Mar. 9, 2006

(65) Prior Publication Data

US 2007/0213120 A1 Sep. 13, 2007

(51) Int. Cl.
*G06Q 10/00* (2012.01)
(52) U.S. Cl.
USPC ............................................. 705/28; 463/42
(58) Field of Classification Search
USPC ............... 382/229; 705/30, 35, 38, 4, 7, 8, 705/10, 12, 27; 715/513; 235/380, 375, 379
See application file for complete search history.

(56) References Cited

U.S. PATENT DOCUMENTS

| | | | |
|---|---|---|---|
| 6,115,690 A * | 9/2000 | Wong | 705/7.27 |
| 6,850,643 B1 * | 2/2005 | Smith et al. | 382/173 |
| 2003/0228910 A1 * | 12/2003 | Jawaharlal et al. | 463/42 |
| 2006/0025984 A1 * | 2/2006 | Papaefstathiou et al. | 703/22 |

OTHER PUBLICATIONS

Lottery scheduling: flexible proportional-share resource management, Carl A. Waldspurger, William E. Weihl, OSDI '94 Proceedings of the 1st USENIX conference on Operating Systems Design and Implementation, Article No. 1 USENIX Association Berkeley, CA, USA © 1994.*

* cited by examiner

*Primary Examiner* — Matthew Gart
*Assistant Examiner* — Rokib Masud
(74) *Attorney, Agent, or Firm* — Douglas A. Lashmit; Hoffman Warnick LLC

(57) ABSTRACT

The present invention provides a method, system, and program product for processing transaction data. Specifically, under the present invention, data such as lottery transaction data is received and stored in a transaction master journal file. Upon receipt, A/R data is extracted from the transaction data and fed to a queue. From the queue, the A/R data is read and processed to provide A/R details, summaries and/or reports. In a typical embodiment, the A/R data is processed to provide A/R activity details such as winner payouts, seller commissions, redeemer commissions, etc.

20 Claims, 11 Drawing Sheets

| Time | Sunday 8/19/2001 | Monday 8/20/2001 | Tuesday 8/21/2001 | Wednesday 8/22/2001 | Min | Max | Avg |
|---|---|---|---|---|---|---|---|
| 0600 – 0700 | 1376 | 7473 | 10521 | 22571 | 1376 | 22571 | 10485 |
| 0700 – 0800 | 3943 | 11636 | 18708 | 44081 | 3943 | 44081 | 19592 |
| 0800 – 0900 | 5319 | 19109 | 29229 | 66652 | 5319 | 66652 | 30077 |
| 0900 – 1000 | 10527 | 24688 | 35107 | 69563 | 10527 | 69563 | 34971 |
| 1000 – 1100 | 13444 | 30358 | 44056 | 83242 | 13444 | 83242 | 42775 |
| 1100 – 1200 | 23971 | 55046 | 79163 | 152805 | 23971 | 152805 | 77746 |
| 1200 – 1300 | 18117 | 46336 | 64055 | 123587 | 18117 | 123587 | 63024 |
| 1300 – 1400 | 18783 | 37008 | 54862 | 118871 | 18783 | 118871 | 57381 |
| 1400 – 1500 | 36900 | 83344 | 118917 | 242458 | 36900 | 242458 | 120405 |
| 1500 – 1600 | 20135 | 34189 | 56439 | 130505 | 20135 | 130505 | 60317 |
| 1600 – 1700 | 21149 | 36738 | 62292 | 141512 | 21149 | 141512 | 65423 |
| 1700 – 1800 | 41284 | 70927 | 118731 | 272017 | 41284 | 272017 | 125740 |
| 1800 – 1900 | 22088 | 42650 | 72775 | 179861 | 22088 | 179861 | 79344 |
| 1900 – 2000 | 22912 | 40933 | 73092 | 169483 | 22912 | 169483 | 76605 |
| 2000 – 2100 | 45000 | 83583 | 145867 | 349344 | 45000 | 349344 | 155949 |
| 2100 – 2200 | 18968 | 32327 | 55031 | 101430 | 18968 | 101430 | 51989 |
| 2200 – 2300 | 13816 | 18396 | 28848 | 28848 | 12773 | 28848 | 18458 |
| 2300 – 2400 | 875 | 2444 | 4884 | 577 | 577 | 4884 | 2195 |
| Total | 338607 | 677385 | 1072577 | 2281332 | 338607 | 2281332 | 1092475 |
| All Transactions | 1176359 | 1369366 | 1705475 | 2807388 | 1176359 | 2807388 | 1764647 |

FIG. 4

| Time | Thursday 8/23/2001 | Friday 8/24/2001 | Saturday 8/25/2001 | Min | Max | Avg |
|---|---|---|---|---|---|---|
| 0600 – 0700 | 10890 | 4115 | | 4115 | 24692 | 13232 |
| 0700 – 0800 | 22424 | 42895 | 48550 | 22424 | 48550 | 37956 |
| 0800 – 0900 | 33314 | 47010 | 73242 | 33314 | 73242 | 51189 |
| 0900 – 1000 | 41391 | 81644 | 112277 | 41391 | 112277 | 78437 |
| 1000 – 1100 | 51291 | 102696 | 130061 | 51291 | 130061 | 94683 |
| 1100 – 1200 | 92682 | 184340 | 242338 | 92682 | 242338 | 173120 |
| 1200 – 1300 | 71692 | 144237 | 160983 | 71692 | 160983 | 125637 |
| 1300 – 1400 | 65397 | 131650 | 149450 | 65397 | 149450 | 115499 |
| 1400 – 1500 | 137089 | 275887 | 310433 | 137089 | 310433 | 241136 |
| 1500 – 1600 | 63120 | 121138 | 147779 | 63120 | 147779 | 110679 |
| 1600 – 1700 | 71650 | 116513 | 154106 | 71650 | 154106 | 114090 |
| 1700 – 1800 | 134770 | 237651 | 301885 | 134770 | 301885 | 224769 |
| 1800 – 1900 | 79444 | 111340 | 169437 | 79444 | 169437 | 120074 |
| 1900 – 2000 | 78711 | 111006 | 161792 | 7871 | 161792 | 117170 |
| 2000 – 2100 | 158155 | 222346 | 331229 | 158155 | 331229 | 237243 |
| 2100 – 2200 | 54841 | 88509 | 101046 | 54841 | 101046 | 81465 |
| 2200 – 2300 | 31728 | 59568 | 13264 | 13264 | 59568 | 34853 |
| 2300 – 2400 | 7146 | 20372 | 563 | 563 | 20372 | 9360 |
| Total | 1205735 | 2102917 | 2633127 | 1205735 | 2633127 | 1980593 |
| All Transactions | 2047218 | 2668223 | 3154121 | 2047218 | 3154121 | 2623187 |

FIG. 6

| Time | Sunday 8/26/2001 | Monday 8/27/2001 | Tuesday 8/28/2001 | Wednesday 8/29/2001 | Min | Max | Avg |
|---|---|---|---|---|---|---|---|
| 0600 - 0700 | 1579 | 5133 | 6029 | 7283 | 1579 | 7283 | 5006 |
| 0700 - 0800 | 3332 | 8110 | 8792 | 11219 | 3332 | 11219 | 7863 |
| 0800 - 0900 | 4911 | 13243 | 14821 | 18502 | 4911 | 18502 | 12869 |
| 0900 - 1000 | 8396 | 13664 | 14388 | 17416 | 8396 | 17416 | 13466 |
| 1000 - 1100 | 9955 | 17210 | 17423 | 20850 | 9955 | 20850 | 16360 |
| 1100 - 1200 | 18351 | 30874 | 31811 | 38266 | 18351 | 38266 | 29826 |
| 1200 - 1300 | 12281 | 26943 | 27233 | 32755 | 12281 | 32755 | 24803 |
| 1300 - 1400 | 12505 | 18239 | 19191 | 24589 | 12505 | 24589 | 18631 |
| 1400 - 1500 | 24786 | 45182 | 46424 | 57344 | 24786 | 57344 | 43434 |
| 1500 - 1600 | 13589 | 14679 | 17126 | 26960 | 13589 | 26960 | 18089 |
| 1600 - 1700 | 14514 | 16197 | 19577 | 31902 | 14514 | 31902 | 20548 |
| 1700 - 1800 | 28103 | 30876 | 36703 | 58862 | 28103 | 58862 | 38636 |
| 1800 - 1900 | 15969 | 18160 | 22886 | 6910 | 6910 | 22886 | 15981 |
| 1900 - 2000 | 16693 | 19584 | 22910 | 39248 | 16693 | 39248 | 24609 |
| 2000 - 2100 | 32662 | 37744 | 45796 | 46158 | 32662 | 46158 | 40590 |
| 2100 - 2200 | 14161 | 16949 | 21001 | 29817 | 14161 | 29817 | 20482 |
| 2200 - 2300 | 9500 | 12354 | 12982 | 12694 | 9500 | 12982 | 11883 |
| 2300 - 2400 | 511 | 690 | 776 | 602 | 511 | 776 | 645 |
| Total | 241798 | 345831 | 385869 | 481377 | 241798 | 481377 | 363719 |
| All Transactions | 1095971 | 1128637 | 1094635 | 1244496 | 1094635 | 1244496 | 1140935 |

FIG. 8

| Time | Min | Max | Avg | Min Trans / Sec | Max Trans / Sec | Avg Trans / Sec |
|---|---|---|---|---|---|---|
| 0600 - 0700 | 1376 | 22571 | 10485 | 0.38 | 6.86 | 2.36 |
| 0700 - 0800 | 3943 | 44081 | 19592 | 0.93 | 13.49 | 5.13 |
| 0800 - 0900 | 5319 | 66652 | 30077 | 1.36 | 20.35 | 7.58 |
| 0900 - 1000 | 10527 | 69563 | 34971 | 2.33 | 31.19 | 10.13 |
| 1000 - 1100 | 13444 | 83242 | 42775 | 1.09 | 36.13 | 11.94 |
| 1100 - 1200 | 23971 | 152805 | 77746 | 5.10 | 67.32 | 21.72 |
| 1200 - 1300 | 18117 | 123587 | 63024 | 3.41 | 44.72 | 17.44 |
| 1300 - 1400 | 18783 | 118871 | 57381 | 3.47 | 41.51 | 15.09 |
| 1400 - 1500 | 36900 | 242458 | 120405 | 6.89 | 86.23 | 31.34 |
| 1500 - 1600 | 20135 | 130505 | 60317 | 3.77 | 41.05 | 14.66 |
| 1600 - 1700 | 21149 | 141512 | 65423 | 4.03 | 42.81 | 15.70 |
| 1700 - 1800 | 41284 | 272017 | 125740 | 7.81 | 83.86 | 29.72 |
| 1800 - 1900 | 22088 | 179861 | 79344 | 1.92 | 49.96 | 17.05 |
| 1900 - 2000 | 22912 | 169483 | 76605 | 4.64 | 47.08 | 17.32 |
| 2000 - 2100 | 45000 | 349344 | 155949 | 9.07 | 97.04 | 33.46 |
| 2100 - 2200 | 18968 | 101430 | 51989 | 3.93 | 28.18 | 12.64 |
| 2200 - 2300 | 12773 | 28848 | 18458 | 2.64 | 16.55 | 5.80 |
| 2300 - 2400 | 577 | 4884 | 2195 | 0.14 | 5.66 | 0.91 |
| Total | 338607 | 2281332 | 1092475 | 3.73 | 40.63 | 15.00 |
| All Transactions | 1176359 | 2807388 | 1764647 | 16.89 | 48.67 | 26.33 |

FIG. 10

METHOD, SYSTEM AND PROGRAM PRODUCT FOR PROCESSING TRANSACTION DATA

BACKGROUND OF THE INVENTION

1. Field of the Invention

The present invention generally relates to transaction data processing. Specifically, the present invention relates to a method, system, and program product for processing transaction data such as lottery transaction data to determine account receivable (A/R) information and the like.

2. Related Art

Data availability in the lottery industry is very limited when it comes to ticket level detail, and access by lottery retailers is typically limited to daily and weekly reports available at the lottery terminal. Traditionally, a lottery interfaces to a retailer via a third party "provide" that collects data by retailer through their lottery terminal that is connected to the third party system. This data is sent to the lottery periodically (e.g., daily) so that A/R personnel at the lottery can balance their backend A/R system and produce Electronic Funds Transfers (EFT) with the bank. While this system avoids the lottery having to manage the large amounts of data, it also exposes them to risk. Specifically, under this system, the lottery must rely on the third party to correctly provide sales and commission data to both the retailer and the lottery itself. This situation is further exasperated by the fact the lottery has limited audit ability since it does not store individual transactions in-house. Specifically, current technology relies on the third party provider to provide detailed transaction data when further research is necessary via an offline method (Compact Disc, tape, etc.)

In view of the foregoing, there exists a need for an approach that solves at least one of the problems with the existing art.

SUMMARY OF THE INVENTION

In general, the present invention provides a method, system, and program product for processing transaction data. Specifically, under the present invention, data such as lottery transaction data is received and stored in a transaction master journal file. Upon receipt, A/R data is extracted from the transaction data and fed to a queue. From the queue, the A/R data is read and processed to provide A/R details, summaries and/or reports. In a typical embodiment, the A/R data is processed to provide A/R activity details such as winner payouts, seller commissions, redeemer commissions, etc.

The present invention utilizes a set of files/tables that assist in providing the functionality set forth herein. For example, the following files can be provided: a statistics file for storing statistics related to the transaction data and A/R activity or data, a game table for storing details of lottery games, a drawing table for storing details of lottery drawings, a transaction history file for storing details of a lottery transaction history, a A/R transaction file for storing the A/R data, an A/R detail file for storing details of A/R activity, and an A/R summary file for storing summaries of the A/R activity.

A first aspect of the present invention provides a method for processing transactions, comprising: receiving transaction data; extracting accounts receivable (A/R) data from the transaction data; feeding the A/R data to a queue; and reading the queue and processing the A/R data.

A second aspect of the present invention provides a system for processing lottery transactions, comprising: a transaction receiver processor for receiving lottery transaction data; a transaction extraction processor for extracting accounts receivable (A/R) data from the lottery transaction data; a transaction sender processor system for feeding the A/R data to a queue; and an A/R processing system for reading the queue and processing the A/R data.

A third aspect of the present invention provides a program product stored on a computer useable medium for processing transactions, comprising, the computer useable medium comprising program code for causing a computer system to perform the following steps: receiving transaction data; extracting accounts receivable (A/R) data from the transaction data; feeding the A/R data to a queue; and reading the queue and processing the A/R data.

A fourth aspect of the present invention provides a method for processing transactions, comprising: providing a computer infrastructure being operable to: receive transaction data; extract accounts receivable (A/R) data from the transaction data; feed the A/R data to a queue; and read the queue and processing the A/R data.

A fifth aspect of the present invention provides computer software embodied in a propagated signal for processing transactions, the propagated signal comprises instructions for causing a computer system to perform the following steps: receiving transaction data; extracting accounts receivable (A/R) data from the transaction data; feeding the A/R data to a queue; and reading the queue and processing the A/R data.

A sixth aspect of the present invention provides a business method for processing transactions.

Therefore, the present invention provides a method, system, and program product for processing transaction such as lottery transactions.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which:

FIG. 4 depicts a table of transaction volume over a four day period in accordance an illustrative example of the present invention.

FIG. 6 depicts a table of transaction volume over another four day period in accordance another illustrative example of the present invention.

FIG. 8 depicts a table of transaction volume over another four day period in accordance another illustrative example of the present invention.

FIG. 10 depicts a table summarizing the transaction volume of FIGS. 3-9 in accordance an illustrative example of the present invention.

It is noted that the drawings of the invention are not to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

As indicated above, the present invention provides a method, system, and program product for processing transaction data. Specifically, under the present invention, data such as lottery transaction data is received and stored in a transaction master journal file. Upon receipt, A/R data is extracted from the transaction data and fed to a queue. From the queue, the A/R data is read and processed to provide A/R details, summaries and/or reports. In a typical embodiment, the A/R data is processed to provide AIR activity details such as winner payouts, seller commissions, redeemer commissions, etc.

It should be appreciated that in a typical embodiment, the present invention is implemented to process transaction data related a lottery. However, this need not be the case. Rather, the present invention could be implemented to receive and process any type of transaction data.

Figure 1:
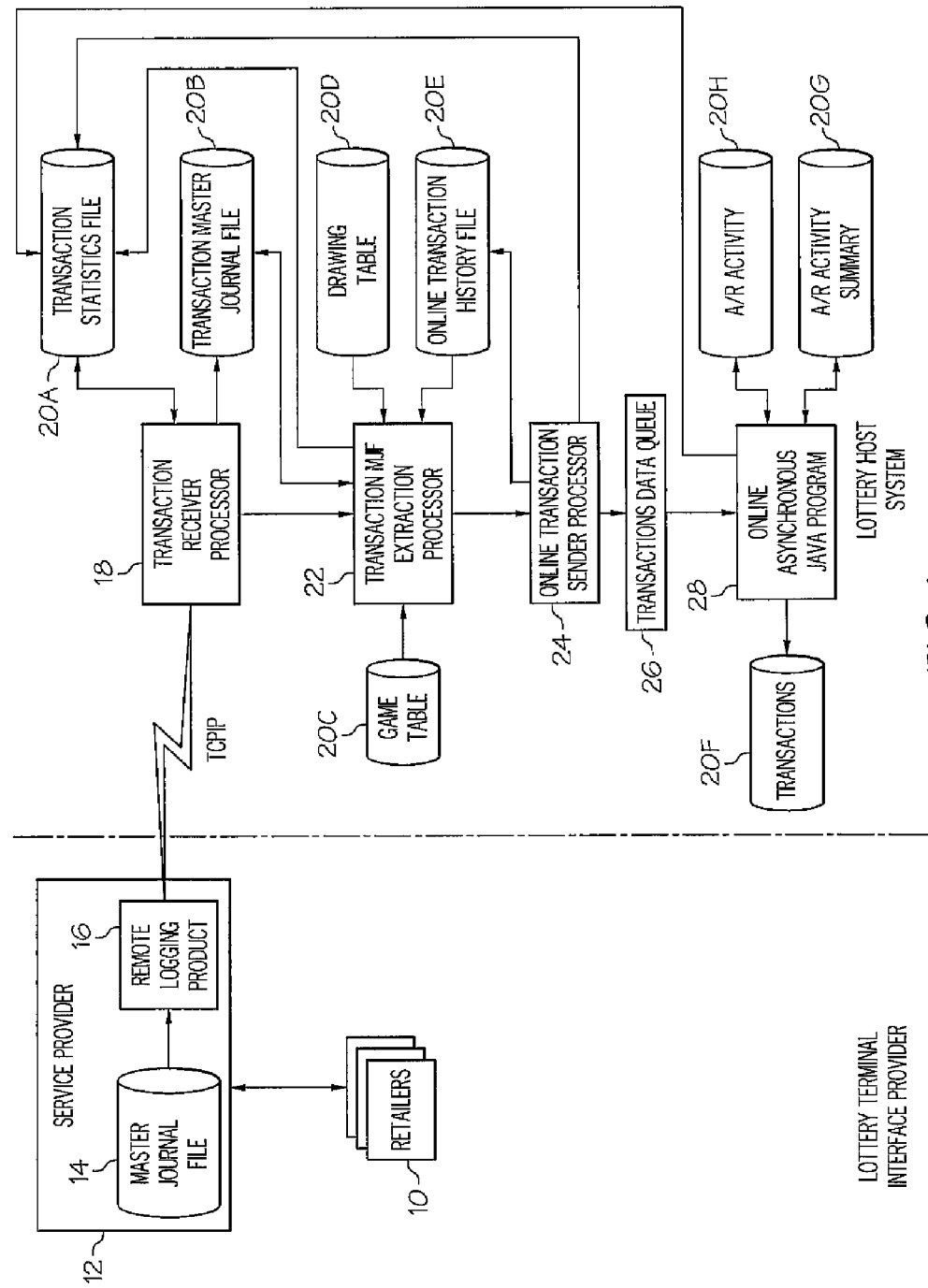
FIG. 1 depicts an architectural flow diagram in accordance with the present invention.

In any event, referring now to FIG. 1, an architectural flow diagram in accordance with one embodiment of the present invention is shown. In general, an interface or service provider 12 will gather transaction data from retailers 10. This typically occurs by an interface with terminals such as lottery terminal maintained by retailers 10. Service provider will store the transaction data in a master journal file 14 or the like. Once stored, remote logging product 16 will communicate the transaction data to transaction receiver processor 18. The receipt of transaction data by transaction receiver processor 18 can occur according to any time frame (e.g., hourly, daily, etc.). In addition, it can occur on a "pull" or "push" basis. To this extent, remote logging product 16 provides an interface between transaction receiver processor 18 and master journal file 14. Regardless, upon receipt, transaction receiver processor will 22 store/write statistics derived from the transaction data to a statistics file 20A. Such statistics can include any type of statistics derived from the "raw" transaction data such as lottery games played, retailer 10 sales, win/loss data, etc. In addition, transaction receiver processor 18 will store all transaction data received in a transaction master journal file 20B. This provides a level of redundancy in the event, service provider 12 experiences a failure, or there is a communications error.

In any event, the transaction data will be communicated to transaction extraction processor 22, which will extract A/R data from the transaction data. In general, A/R data can include any data related to any type of A/R activities (i.e., activities that requires some type of payment). For example, A/R data can relate to winner payouts, seller commissions, redeemer commissions, funds owed by retailers 10 from sales, etc. In performing its functions, transaction extraction processor 22, can utilize a set of tables/files 20C-E. Specifically, transaction extraction processor 22 can read a game file 20C that contains details of lottery games available. Game file 20C generally sets forth available lottery games, rules, etc. Further, drawing file 20D can be provided that details of lottery drawings, such as drawing schedules, data for validating winning tickets, etc. In addition, a transaction history file 20E can be provided for storing details related to lottery transaction history such as sales per retailer, wins/loses sold per retailer, etc. The transaction history details are typically provided to transaction history file 20E by transaction sender processor 24, and are read by transaction extraction processor 22. In addition, any A/R data extracted can be stored in transaction master journal file 20B. The A/R data extracted by transaction extraction processor 22 will be communicated to transaction sender processor 24, which will store corresponding A/R statistics in transaction statistics file 20A and provide the A/R date to queue 26. Along these lines, the A/R data can be grouped and fed to queue according to any basis such as by specific retailer 10, time increments (e.g., date or time), service provider 12, etc.

Once the A/R date is on queue 26, it will be read and processed by AIR processing system 28. As shown in FIG. 1, A/R processing system 28 typically comprises an asynchronous Java program, but this need not be the case (Java and Java-based terms are trademarks of Sun Microsystems, Inc. in the Unites States or other countries). In general, A/R processing system 28 will utilize configuration data to process and break down A/R data to determine A/R activity or transactions. In performing this function, A/R processing system 28 will compute any commissions that are due. Specifically, in the lottery context, retailers 10 that sell or redeem (to/for lottery players) winning tickets are due commissions, which will be computer by A/R processing system 28 based on the A/R data read from queue 26.

As A/R processing system 28 determines A/R transactions/activities, it will store the same in A/R transaction file 20F. In addition, A/R/processing system 28 can cache summary transaction data along with a database index for each 10 retailer (e.g., by day). A/R processing system 28 will then manipulate the A/R data into A/R activity reports/summaries that are stored in files 20G-H. Specifically, A/R activity file 20H will receive and store any A/R activities determined by A/R processing system. A/R activity summary file 20G will receive and store summaries of the A/R activities (e.g., by retailer 10, service provider 12, date, etc.). Similarly, statistics related to A/R activities will be stored in transaction statistics file 20A.

Because of the near real-time processing of the transactions from the retailer 10's terminal, an A/R staff member or retailer 10 themselves can see transactions within seconds of the transaction being created via a web interface that reads the A/R transaction and A/R activity summary 20G and/or A/R activity file 20H. Since both daily and detailed transaction are available, it possible to view a retailers 10 sales at the ticket level even knowing the time the ticket was sold and what lottery terminal the ticket(s) where purchased. The summary transactions provide the capability of calculating the retailers bill without summarizing individual transactions instead the daily summaries are summarized to produce a dynamic bill whenever it is viewed or a weekly bill that will be paid for later. Any bills can be generated by A/R processing system 28 and provided electronically or other wise to retailers 10.

Figure 2:
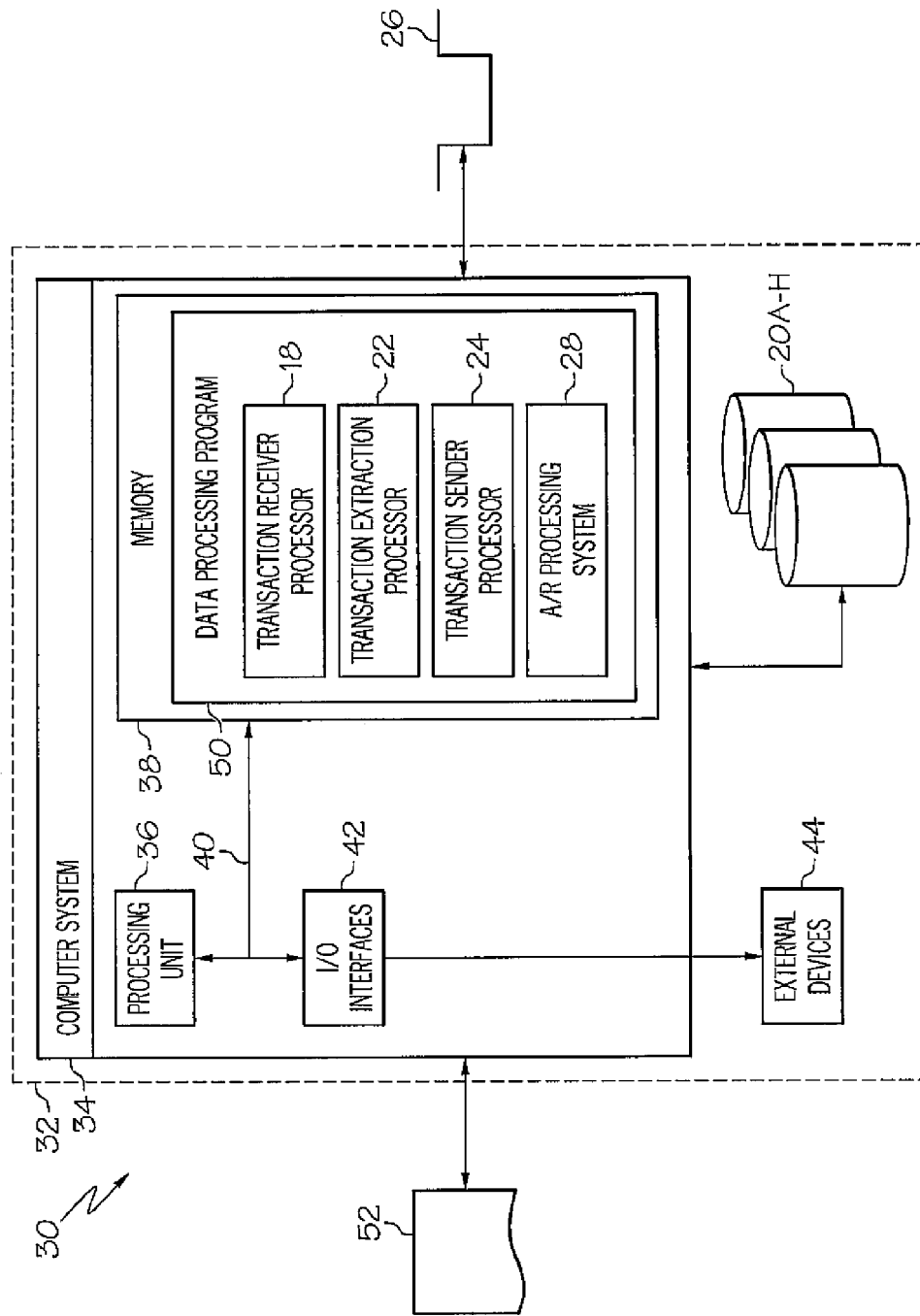
FIG. 2 depicts a more detailed computerized implementation in accordance with the present invention.

Referring now to FIG. 2, a more detailed diagram of a computerized implementation 30 of the present invention is shown. As depicted, implementation 30 includes a computer system 34 deployed within a computer infrastructure 32. This is intended to demonstrate, among other things, that the present invention could be implemented within a network environment (e.g., the Internet, a wide area network (WAN), a local area network (LAN), a virtual private network (VPN), etc.), or on a stand-alone computer system. In the case of the former, communication throughout the network can occur via any combination of various types of communications links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer infrastructure 32 is intended to demonstrate that some or all of the components of implementation 30 could be deployed, managed, serviced, etc. by a service provider (e.g., other than service provider 12 of FIG. 1) who offers to process transactions (e.g., lottery transaction) for customers such as state or federal lotteries.

As shown, computer system 34 includes a processing unit 36, a memory 38, a bus 40, and input/output (I/O) interfaces 42. Further, computer system 34 is shown in communication with external I/O devices/resources 44 and storage system/files 20A-H. In general, processing unit 36 executes computer program code, such as data processing program 50, which is typically stored in memory 38. While executing computer program code, processing unit 36 can read and/or write data to/from memory 38, files 20A-H, and/or I/O interfaces 42. Bus 40 provides a communication link between each of the components in computer system 34. External devices 44 can comprise any devices (e.g., keyboard, pointing device, display, etc.) that enable a user to interact with computer system 34 and/or any devices (e.g., network card, modem, etc.) that enable computer system 34 to communicate with one or more other computing devices such as that maintained by retailer 10 (FIG. 1) and/or service provider 12 (FIG. 1).

Computer infrastructure 32 is only illustrative of various types of computer infrastructures for implementing the invention. For example, in one embodiment, computer infrastructure 32 comprises two or more computing devices (e.g., a server cluster) that communicate over a network to perform the various process steps of the invention. Moreover, computer system 34 is only representative of various possible computer systems that can include numerous combinations of hardware. To this extent, in other embodiments, computer system 34 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively. Moreover, processing unit 36 may comprise a single processing unit, or be distributed across one or more processing units in one or more locations, e.g., on a client and server. Similarly, memory 38 and/or files 20A-H can comprise any combination of various types of data storage and/or transmission media that reside at one or more physical locations. Further, I/O interfaces 42 can comprise any system for exchanging information with one or more external devices 44. Still further, it is understood that one or more additional components (e.g., system software, math co-processing unit, etc.) not shown in FIG. 2 can be included in computer system 34. However, if computer system 34 comprises a handheld device or the like, it is understood that one or more external devices 44 (e.g., a display) and/or storage system(s) 46 could be contained within computer system 34, not externally as shown.

Files 20A-H can be or exist within any type of system(s) (e.g., a databases) capable of providing storage for the aforementioned information under the present invention, etc. To this extent, any system(s) providing storage for files 20A-H could include one or more storage devices, such as a magnetic disk drive or an optical disk drive. In another embodiment, such system(s) includes data distributed across, for example, a local area network (LAN), wide area network (WAN) or a storage area network (SAN) (not shown). Although not shown, additional components, such as cache memory, communication systems, system software, etc., may be incorporated into computer system 34. It should also be understood that although not shown for brevity purposes, computerized system maintained by retailers 10 and/or service provider 12 will include computer components similar to computer system 34.

Shown in memory 38 of computer system 34 is data processing program 50, which includes connection transaction receiver processor 18, transaction extraction processor 22, transaction sender processor 24, and A/R processing system 28. These systems provide the functionality of the present invention discussed above. Specifically, transaction receiver processor 18 will receive transaction data 52 (e.g., from service provider 12). Transaction extraction processor 22 will extract A/R data from transaction data 52 and provide the same to transaction sender processor 24, which will place the same on queue 26. A/R processing system 28 will read the A/R data from queue 26 and process the same.

In general, the processing of transaction data 52 is time sensitive since all transactions usually should be processed by midnight so the other lottery processes can run such as billing, EFTs with banks. In the following illustrative examples, statistics were used to determine the max, min and average transactions for a high dollar lottery drawing. These numbers were used to determine the throughput necessary to complete the transaction processing between the lottery terminal shutdown and the asynchronous transaction process shutdown. Reference will be made to FIGS. 3-11 in conjunction with some illustrative examples to demonstrate some of the reporting capability of A/R processing system 28.

Two Weeks of Online Ticket Transactions

The following two week period demonstrates the number of transactions processed for online tickets during a week of high ticket sales and the week following when the jackpot returned to $10 million. There are three distinct periods that will be discussed:

Aug. 19, 2001-Aug. 22, 2001. Jackpot of $250 million, drawing on Aug. 22, 2001 with no winner.

Aug. 23, 2001-Aug. 25, 2001. Jackpot of $295 million, drawing on Aug. 25, 2001 with jackpot winners.

Aug. 26, 2001-Aug. 1, 2001. Jackpot of $10 million, drawing on Aug. 29, 2001 and Sep. 1, 2001.

Figure 3:
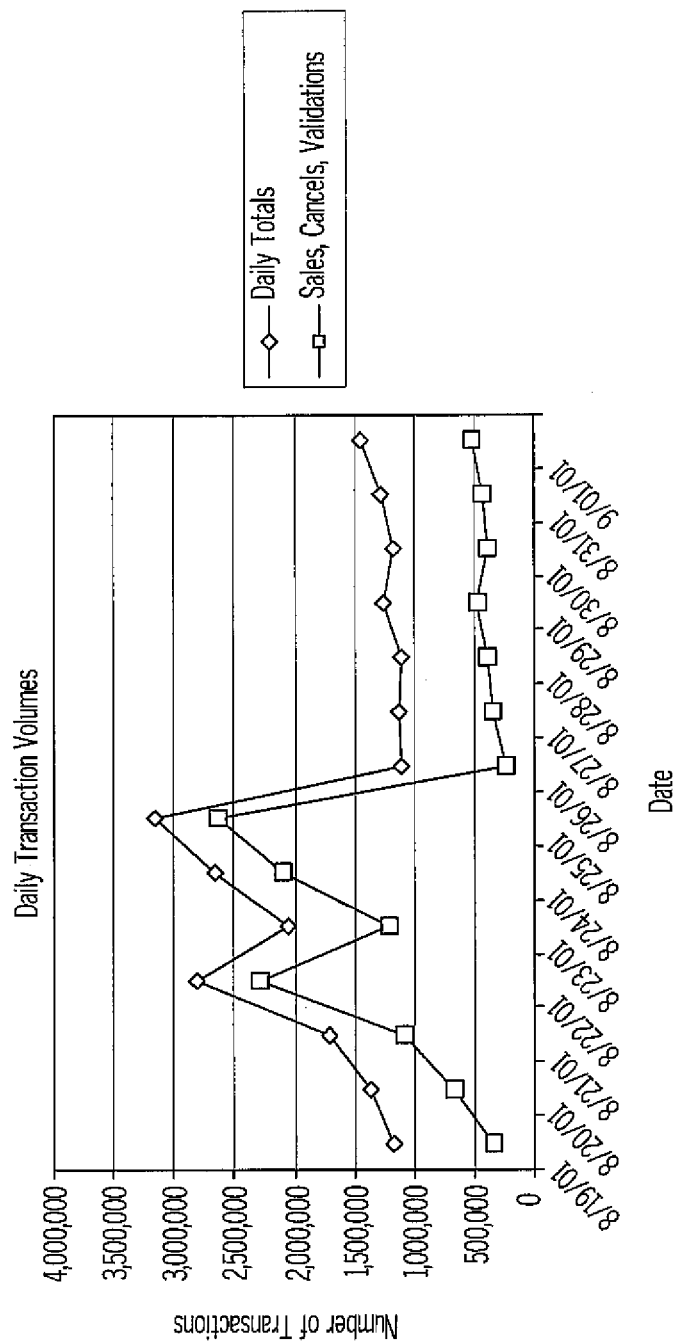
FIG. 3 depicts a chart of daily transaction volumes in accordance with an illustrative example of the present invention.
Figure 5:
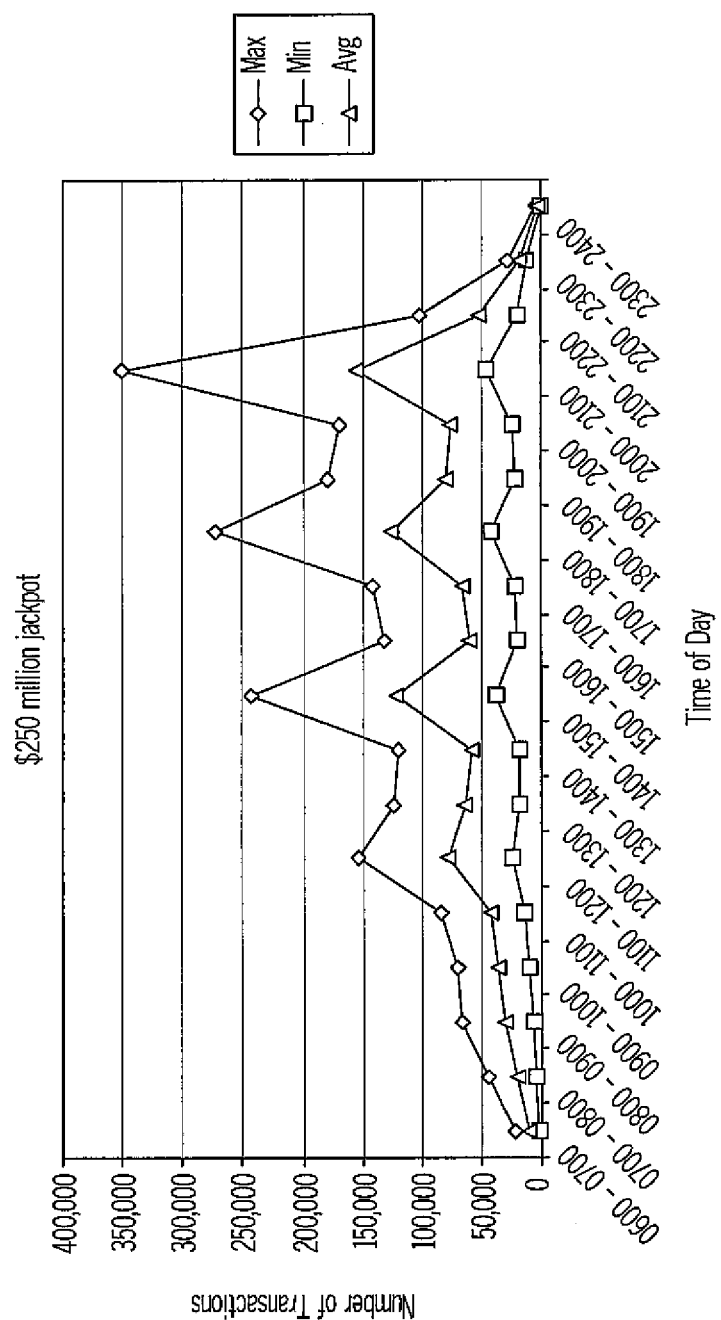
FIG. 5 depicts a chart of hourly transaction rates based on the table of FIG. 4.
Figure 7:
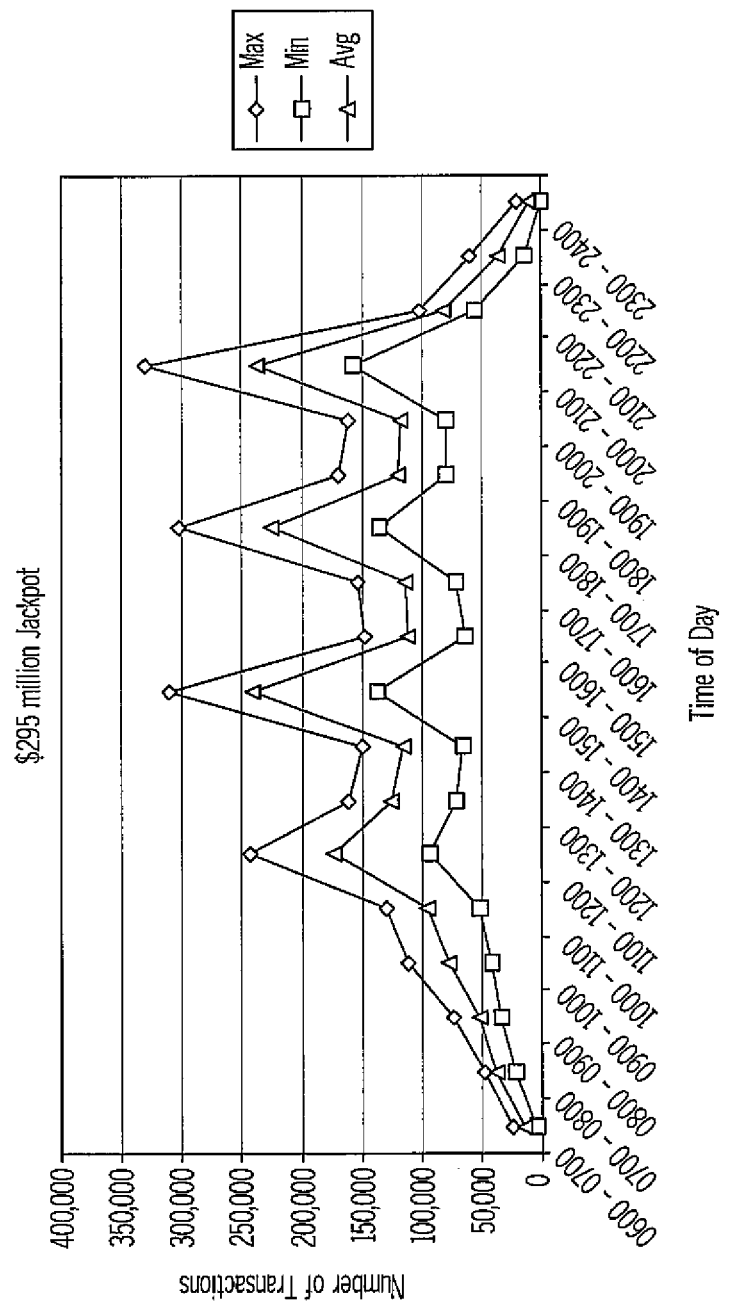
FIG. 7 depicts a chart of hourly transaction rates based on the table of FIG. 6.
Figure 9:
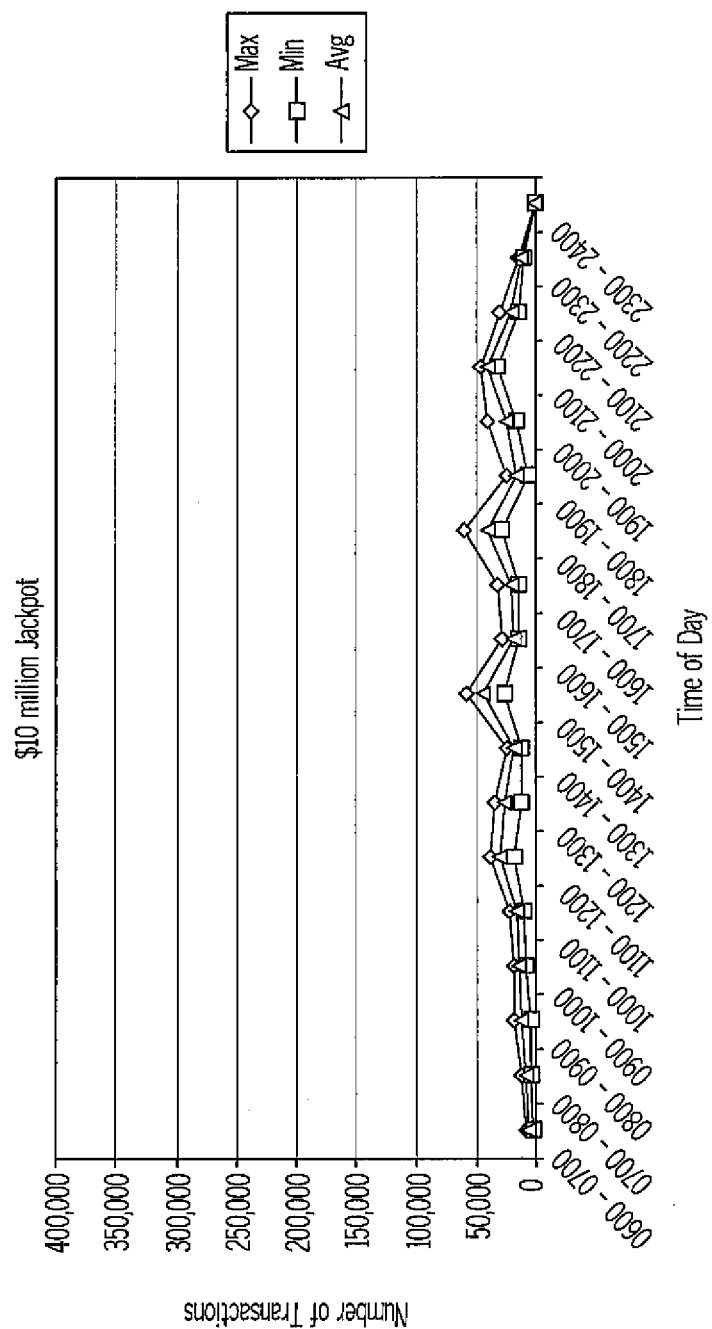
FIG. 9 depicts a chart of hourly transaction rates based on the table of FIG. 8.
Figure 11:
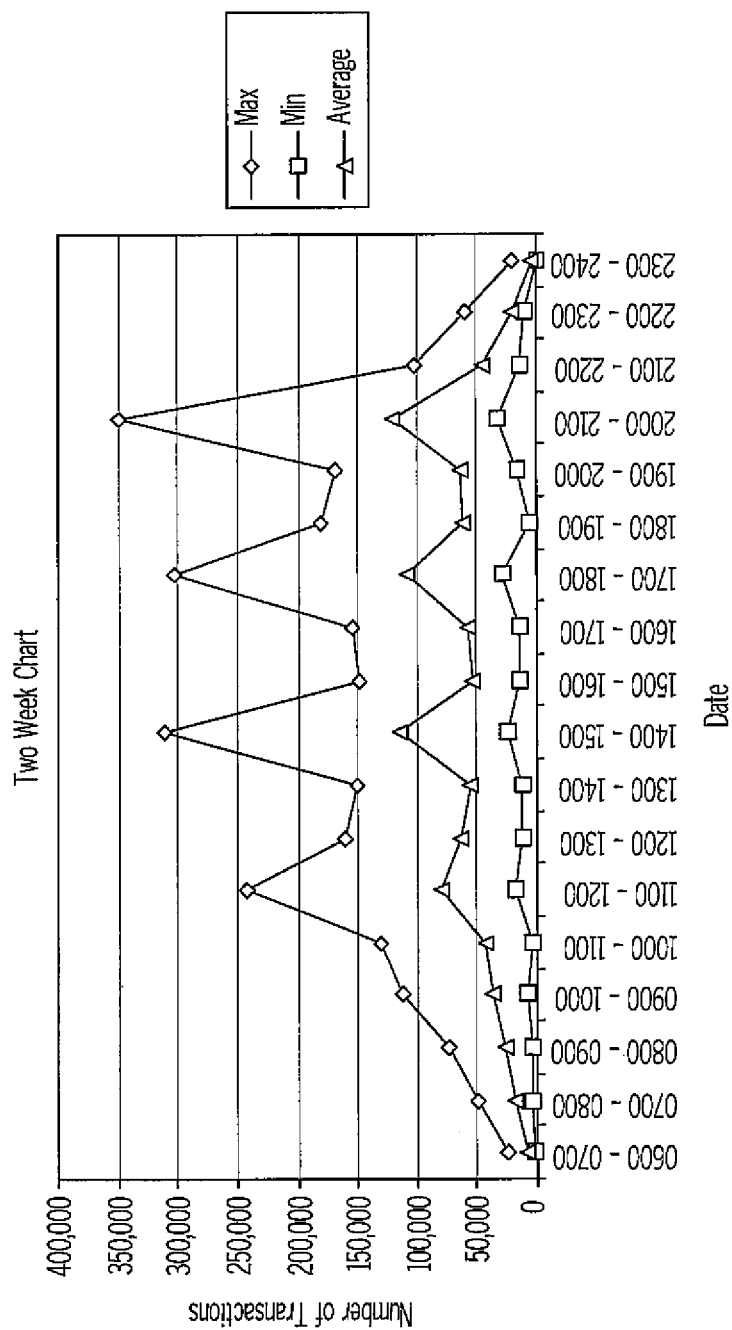
FIG. 11 depicts a chart of hourly transaction rates based on the table of FIG. 10.

FIG. 3 shows a chart of the number of transactions during this two week period. During the period of Aug. 19, 2001-Aug. 22, 2001, the jackpot was $250 million. FIG. 4 shows a table depicting the number of transactions observed over this four day period. FIG. 5 shows a chart depicting the hourly transaction rates based on the information of FIG. 4. During the period of Aug. 23, 2001-Aug. 25, 2001, the jackpot was $295 million. FIG. 6 shows a table depicting the number of transactions observed over this four day period. FIG. 7 shows a chart depicting the hourly transaction rates based the information of FIG. 6. During the period of Aug. 26, 2001-Sep. 1, 2001, the jackpot started at $10 million. FIG. 8 shows a table depicting the number of transactions observed over this four day period. FIG. 9 shows a chart depicting the hourly transaction rates based on the information of FIG. 8. FIG. 10 shows a table depicting the minimum, maximum, and average number of transactions over this two week period, rates. Referring to the table of FIG. 10, it can be seen that the maximum transaction rate for the peak hour is approximately 97 transactions per second and for the peak day are 41 transactions per second. The average transaction rate is likely to be in the 15 to 25 transactions per second range. The primary transaction volumes occur between 10 am to 10 pm with spikes at 11 am-noon, 2 pm-3 pm, 5 pm-6 pm, and 8 pm-9 pm. This is shown more clearly in the table of FIG. 11.

While shown and described herein as a method and system for processing transactions, it is understood that the invention further provides various alternative embodiments. For example, in one embodiment, the invention provides a computer-readable storage medium that includes computer program code to enable a computer infrastructure to process transactions. To this extent, the computer-readable storage medium includes program code that implements each of the various process steps of the invention. It is understood that the terms computer-readable storage medium or computer useable medium comprises one or more of any type of physical embodiment of the program code. In particular, the computer-readable storage medium can comprise program code embodied on one or more portable storage articles of manufacture (e.g., a compact disc, a magnetic disk, a tape, etc.), on one or more data storage portions of a computing device, such as memory 38 (FIG. 2) and/or storage system 46 (FIG. 2) (e.g., a fixed disk, a read-only memory, a random access memory, a cache memory, etc.).

In another embodiment, the invention provides a business method that performs the process steps of the invention on a subscription, advertising, and/or fee basis. That is, a service provider, such as a Solution Integrator, could offer to process transactions. In this case, the service provider can create, maintain, support, etc., a computer infrastructure, such as computer infrastructure 32 (FIG. 2) that performs the process steps of the invention for one or more customers. In return, the service provider can receive payment from the customer(s) under a subscription and/or fee agreement and/or the service provider can receive payment from the sale of advertising content to one or more third parties.

In still another embodiment, the invention provides a computer-implemented method for processing transactions. In this case, a computer infrastructure, such as computer infrastructure 32 (FIG. 2), can be provided and one or more systems for performing the process steps of the invention can be obtained (e.g., created, purchased, used, modified, etc.) and deployed to the computer infrastructure. To this extent, the deployment of a system can comprise one or more of (1) installing program code on a computing device, such as computer system 34 (FIG. 2), from a computer-readable medium; (2) adding one or more computing devices to the computer infrastructure; and (3) incorporating and/or modifying one or more existing systems of the computer infrastructure to enable the computer infrastructure to perform the process steps of the invention.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic I/O system/driver for a particular computing and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

What is claimed is:

1. A computer-implemented method of processing lottery transactions for creating estimated future invoices, the method comprising:
   utilizing at least one computing device to perform:
      obtaining lottery transaction data from a service provider according to a predetermined schedule, the lottery transaction data continuously obtained at the service provider from a plurality of distinct lottery terminals;
      extracting accounts receivable (A/R) transaction data from the lottery transaction data; and
      asynchronously processing the A/R transaction data to obtain A/R activity data and A/R summary data,
      wherein the A/R activity data provides ticket-level details about all lottery tickets purchased, the ticket-level details including:
         a time the lottery ticket was purchased;
         a cost of the lottery ticket purchased; and
         a location of the distinct lottery terminal where the lottery ticket was purchased; and
      wherein the A/R summary data provides an estimated, future invoice for each of the plurality of distinct lottery terminals based upon the A/R activity data.

2. The computer-implemented method of claim 1, wherein the A/R transaction data includes financial balances associated with each of the distinct lottery terminals.

3. The computer-implemented method of claim 1, wherein the extracting of the A/R transaction data from the lottery transaction data is based on at least one of:
   details of available lottery games, including rules for an available lottery game,
   details of lottery drawings including lottery drawing schedules and data for validating winning lottery tickets, or
   details of lottery transaction history including:
      lottery game sales;
      lottery game results; and
      winning lottery ticket payouts.

4. The computer-implemented method of claim 1, wherein the predetermined schedule for obtaining the lottery transaction data includes at least one of a minutely schedule, a quad-hourly schedule, a bi-hourly schedule, an hourly schedule, or a daily schedule.

5. The computer-implemented method of claim 1, wherein the extracting and the asynchronously processing of the A/R transaction data are both completed within a same calendar day prior to midnight in a local time zone.

6. The computer-implemented method of claim 1, further comprising:
   storing the lottery transaction data in a transaction master journal file;
   storing the A/R transaction data in a A/R transaction file;
   storing the A/R activity data in a A/R activity file; and
   storing the A/R summary data in a A/R summary file.

7. A system comprising:
   at least one computing device configured to process lottery transactions for creating estimated future invoices by performing actions, including:
      obtaining lottery transaction data from a service provider according to a predetermined schedule, the lottery transaction data continuously obtained at the service provider from a plurality of distinct lottery terminals;
      extracting accounts receivable (A/R) transaction data from the lottery transaction data; and asynchronously processing the A/R transaction data to obtain A/R activity data and A/R summary data, wherein the A/R activity data provides ticket-level details about all lottery tickets purchased, the ticket-level details including:
a time the lottery ticket was purchased;
a cost of the lottery ticket purchased; and
a location of the distinct lottery terminal where the lottery ticket was purchased; and wherein the A/R summary data provides an estimated, future invoice for each of the plurality of distinct lottery terminals based upon the A/R activity data.

8. The system of claim 7, wherein the A/R transaction data includes financial balances associated with each of the distinct lottery terminals.

9. The system of claim 7, wherein the extracting of the A/R transaction data from the lottery transaction data is based on at least one of:
details of available lottery games, including rules for an available lottery game,
details of lottery drawings including lottery drawing schedules and data for validating winning lottery tickets, or
details of lottery transaction history including:
lottery game sales;
lottery game results; and
winning lottery ticket payouts.

10. The system of claim 7, wherein the predetermined schedule for obtaining the lottery transaction data includes at least one of a minutely schedule, a quad-hourly schedule, a bi-hourly schedule, an hourly schedule, or a daily schedule.

11. The system of claim 7, wherein the extracting and the asynchronously processing of the A/R transaction data are completed within a same calendar day prior to midnight in a local time zone.

12. The system of claim 7, further comprising:
storing the lottery transaction data in a transaction master journal file;
storing the A/R transaction data in a A/R transaction;
storing the A/R activity data in a A/R activity file; and
storing the A/R summary data in a A/R summary file.

13. The system of claim 7, further comprising:
extracting statistical data from the lottery transaction data, wherein the statistical data includes:
winning lottery game payouts by the distinct lottery terminals;
lottery sales for the distinct lottery terminals; and
a number of lottery tickets purchased at each of the distinct lottery terminals; and
storing the statistical data in a transaction statistics file.

14. A computer program comprising program code embodied in at least one computer-readable storage medium, which when executed, enables a computer system to process lottery transactions for creating estimated future invoices by performing actions comprising:
obtaining lottery transaction data from a service provider according to a predetermined schedule, the lottery transaction data continuously obtained at the service provider from a plurality of distinct lottery terminals;
extracting accounts receivable (A/R) transaction data from the lottery transaction data; and
asynchronously processing the A/R transaction data to obtain A/R activity data and A/R summary data, wherein the A/R activity data provides ticket-level details about all lottery tickets purchased, the ticket-level details including:
a time the lottery ticket was purchased;
a cost of the lottery ticket purchased; and
a location of the distinct lottery terminal where the lottery ticket was purchased; and wherein the A/R summary data provides an estimated, future invoice for each of the plurality of distinct lottery terminals based upon the A/R activity data.

15. The computer program of claim 14, wherein the A/R transaction data includes financial balances associated with each of the distinct lottery terminals.

16. The computer program of claim 14, wherein the extracting of the A/R transaction data from the lottery transaction data is based on at least one of:
details of available lottery games, including rules for an available lottery game,
details of lottery drawings including lottery drawing schedules and data for validating winning lottery tickets, or
details of lottery transaction history including:
lottery game sales;
lottery game results; and
winning lottery ticket payouts.

17. The computer program of claim 14, wherein the predetermined schedule for obtaining the lottery transaction data includes at least one of a minutely schedule, a quad-hourly schedule, a bi-hourly schedule, an hourly schedule, or a daily schedule.

18. The computer program of claim 14, wherein the extracting and the asynchronously processing of the A/R transaction data are both completed within a same calendar day prior to midnight in a local time zone.

19. The computer program of claim 14, further comprising:
storing the lottery transaction data in a transaction master journal file;
storing the A/R transaction data in a A/R transaction file;
storing the A/R activity data in a A/R activity file; and
storing the A/R summary data in a A/R summary file.

20. The computer program of claim 14, further comprising:
extracting statistical data from the lottery transaction data, wherein the statistical data includes:
winning lottery game payouts by the distinct lottery terminals;
lottery sales for the distinct lottery terminals; and
a number of lottery tickets purchased at each of the distinct lottery terminals; and
storing the statistical data in a transaction statistics file.

* * * * *